US009195332B2

(12) United States Patent
Arrasvuori et al.

(10) Patent No.: US 9,195,332 B2
(45) Date of Patent: Nov. 24, 2015

(54) APPARATUS WITH DEFORMABLE FLEXIBLE USER INTERFACE AREA AND ADJUSTABLE HOVER INPUT REGION AND ASSOCIATED METHODS

(71) Applicant: Nokia Corporation, Espoo (FI)

(72) Inventors: Juha Henrik Arrasvuori, Tampere (FI); Jan Peter Erik Eskolin, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 232 days.

(21) Appl. No.: 13/900,982

(22) Filed: May 23, 2013

(65) Prior Publication Data
US 2014/0347273 A1 Nov. 27, 2014

(51) Int. Cl.
G06F 3/041 (2006.01)
G06F 1/16 (2006.01)

(52) U.S. Cl.
CPC ............ *G06F 3/0412* (2013.01); *G06F 1/1652* (2013.01); *G06F 2203/04101* (2013.01); *G06F 2203/04102* (2013.01); *G06F 2203/04108* (2013.01)

(58) Field of Classification Search
CPC ............ G06F 2203/04101; G06F 2203/04102; G06F 2203/04108; G06F 1/1652; G06F 3/0412; G06F 3/044
See application file for complete search history.

(56) References Cited

U.S. PATENT DOCUMENTS

| | | | |
|---|---|---|---|
| 2009/0295715 A1* | 12/2009 | Seo et al. | 345/156 |
| 2010/0045705 A1 | 2/2010 | Vertegaal et al. | 345/661 |
| 2010/0117975 A1* | 5/2010 | Cho | 345/173 |
| 2010/0164888 A1* | 7/2010 | Okumura et al. | 345/173 |
| 2011/0025635 A1 | 2/2011 | Lee | 345/173 |
| 2011/0279397 A1 | 11/2011 | Rimon et al. | 345/173 |
| 2012/0068941 A1 | 3/2012 | Arrasvuori et al. | 345/173 |
| 2014/0253488 A1* | 9/2014 | Vukovic et al. | 345/174 |

FOREIGN PATENT DOCUMENTS

| | | | | |
|---|---|---|---|---|
| EP | 2469394 A1 | 6/2012 | | |
| EP | 2581808 A1 | 4/2013 | | |
| JP | EP2469394 A1 * | 6/2012 | | G06F 3/048 |
| WO | WO-2007/145518 A1 | 12/2007 | | |
| WO | WO-2008/150600 A1 | 12/2008 | | |
| WO | WO-2013/068791 A1 | 5/2013 | | |

OTHER PUBLICATIONS

Gallant, David T., et al., "Towards More Paper-like Input: flexible Input Devices for Foldable Interaction Styles", © 2008 ACM, UIST'08, Oct. 19-22, 2008, Monterey, California, USA, 4 pgs.

* cited by examiner

*Primary Examiner* — Larry Sternbane
(74) *Attorney, Agent, or Firm* — Harrington & Smith (57) ABSTRACT

An apparatus including at least one processor; and at least one memory including computer program code, the at least one memory and the computer program code configured to, with the at least one processor, cause the apparatus to perform at least the following: determine a curvature of a deformable flexible user interface area of an electronic device, the deformable flexible user interface area being capable of detecting user input within a hover region; and based on the determined curvature, enable adjusting the hover input region of the user interface area to maintain a substantially flat planar hover input region across the deformable flexible user interface area.

17 Claims, 5 Drawing Sheets

APPARATUS WITH DEFORMABLE FLEXIBLE USER INTERFACE AREA AND ADJUSTABLE HOVER INPUT REGION AND ASSOCIATED METHODS

TECHNICAL FIELD

The present disclosure relates to the field of deformable flexible user interfaces, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to provide a user interface (e.g. a graphical user interface). A user interface may enable a user to interact with an electronic device, for example, to enter commands, or to receive information from the device (e.g. visual or audio content).

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus comprising:
at least one processor; and
at least one memory including computer program code,
the at least one memory and the computer program code configured to, with the at least one processor, cause the apparatus to perform at least the following:
determine a curvature of a deformable flexible user interface area of an electronic device, the deformable flexible user interface area being capable of detecting user input within a hover region; and
based on the determined curvature, enable adjusting the hover input region of the user interface area to maintain a substantially flat planar hover input region across the deformable flexible user interface area.

The deformable flexible user interface area may comprise a bendable user interface area. The deformable flexible user interface area may comprise a flexible organic light-emitting diode.

The apparatus may be configured to: determine a folding axis and/or bending angle of the flexible user interface area in order to determine the curvature of the deformable flexible user interface area.

The apparatus may be configured such that the substantially flat planar hover input region intersects the deformed flexible user interface area at least at one point on the determined curvature and not at other points on the determined curvature.

The apparatus may be configured to: enable selection of a particular function of the electronic device based on user input provided within the substantially flat planar hover input region.

The apparatus may be configured to: disregard user input provided outside the substantially flat planar hover input region.

The deformable flexible user interface may comprise a capacitive sensor.

The apparatus may be configured to provide a plurality of substantially flat planar hover input regions, each flat planar hover input region being configured to enable initiation of distinct functionality of the electronic device.

The plurality flat planar hover input regions may be spaced apart in a direction normal to the planes of the flat planar hover input regions to form a vertically stacked configuration.

The plurality flat planar hover input regions may be spaced apart in a lateral direction to form a laterally spaced configuration.

The apparatus/device may be configured such that a first substantially flat planar hover input region is associated with functionality corresponding to a touch gesture input as provided in the undeformed configuration and a second substantially flat planar hover input region is associated with functionality corresponding to a hover gesture input as provided in the undeformed configuration, the first substantially flat planar hover input region being closer to the user interface area than the second substantially flat planar hover input region.

The apparatus may be configured to determine a plurality of curvatures of a deformable flexible user interface area.

The substantially flat planar hover input region may be configured to be above the most prominent feature (e.g. the largest or highest peak) of the plurality of determined curvatures.

The user interface may comprise a combination of one or more of a touchpad, and a touch-screen.

The electronic device or apparatus may be a portable electronic device, a laptop computer, a desktop computer, a mobile phone, a Smartphone, a monitor, a tablet computer, a personal digital assistant or a digital camera, or a module for the same.

In a further aspect, there is provided a method comprising:
determining a curvature of a deformable flexible user interface area of an electronic device, the deformable flexible user interface area being capable of detecting user input within a hover region; and
based on the determined curvature, enabling adjusting the hover input region of the user interface area to maintain a substantially flat planar hover input region across the deformable flexible user interface area.

In a further aspect, there is provided a computer program, the computer program comprising code configured to:
determine a curvature of a deformable flexible user interface area of an electronic device, the deformable flexible user interface area being capable of detecting user input within a hover region; and
based on the determined curvature, enable adjusting the hover input region of the user interface area to maintain a substantially flat planar hover input region across the deformable flexible user interface area.

The computer program may be stored on a storage media (e.g. on a CD, a DVD, a memory stick or other non-transitory medium). The computer program may be configured to run on a device or apparatus as an application. An application may be run by a device or apparatus via an operating system.

In a further aspect, there is provided an apparatus, the apparatus comprising:

means for determining a curvature of a deformable flexible user interface area of an electronic device, the deformable flexible user interface area being capable of detecting user input within a hover region; and means for enabling configured to enable adjusting, based on the determined curvature, the hover input region of the user interface area to maintain a substantially flat planar hover input region across the deformable flexible user interface area.

In a further aspect, there is provided an apparatus, the apparatus comprising:

a determiner configured to determine a curvature of a deformable flexible user interface area of an electronic device, the deformable flexible user interface area being capable of detecting user input within a hover region; and an enabler configured to enable adjusting, based on the determined curvature, the hover input region of the user interface area to maintain a substantially flat planar hover input region across the deformable flexible user interface area.

The present disclosure includes one or more corresponding aspects, embodiments or features in isolation or in various combinations whether or not specifically stated (including claimed) in that combination or in isolation. Corresponding means and corresponding function units (e.g. first enabler, second enabler) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EMBODIMENTS

It is common for an electronic device to have a user interface (which may or may not be graphically based) to allow a user to interact with the device to provide, receive and/or interact with information. For example, the user may use their fingers to compose a text message, draw a picture or access a web site, and/or use their ear to listen to a phone call or music.

Some electronic devices have flexible or deformable user interfaces. These may allow the user interface to be deformed according to the user's wishes. For example, the user may wish to roll the user interface up in order to save space. Or the user may wish to deform the flexible user interface to conform to a surface on which it is resting.

It may be advantageous to allow the user to interact with the device in flat planes regardless of the actual shape of the deformed user interface area. This may allow a more consistent user experience within a wider range of situations.

Example embodiments contained herein may be considered to determine a curvature of a deformable flexible user interface area of an electronic device, the deformable flexible user interface area being capable of detecting user input within a hover region; and based on the determined curvature, enable adjusting the hover input region of the user interface area to maintain a substantially flat planar hover input region across the deformable flexible user interface area.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of other similar described embodiments.

Figure 1:
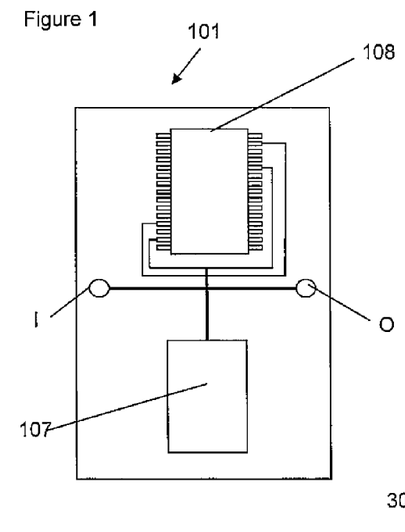
FIG. 1 depicts an example embodiment comprising a number of electronic components, including memory and a processor.

FIG. 1 shows an apparatus (101) comprising memory (107), a processor (108), input I and output O. In this embodiment only one processor and one memory are shown but it will be appreciated that other embodiments may utilise more than one processor and/or more than one memory (e.g. same or different processor/memory types).

In this embodiment the apparatus (101) is an Application Specific Integrated Circuit (ASIC) for a portable electronic device with a touch sensitive display. In other embodiments the apparatus (101) can be a module for such a device, or may be the device itself, wherein the processor (108) is a general purpose CPU of the device and the memory (107) is general purpose memory comprised by the device.

The input I allows for receipt of signalling to the apparatus (101) from further components, such as components of a portable electronic device (like a touch-sensitive display) or the like. The output O allows for onward provision of signalling from within the apparatus (101) to further components. In this embodiment the input I and output O are part of a connection bus that allows for connection of the apparatus (101) to further components.

The processor (108) is a general purpose processor dedicated to executing/processing information received via the input I in accordance with instructions stored in the form of computer program code on the memory (107). The output signalling generated by such operations from the processor (108) is provided onwards to further components via the output O.

The memory (107) (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor (108). The internal connections between the memory (107) and the processor (108) can be understood to, in one or more example embodiments, provide an active coupling between the processor (108) and the memory (107) to allow the processor (108) to access the computer program code stored on the memory (107).

In this example the input I, output O, processor (108) and memory (107) are all electrically connected to one another internally to allow for electrical communication between the respective components I, O, (108, 107). In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
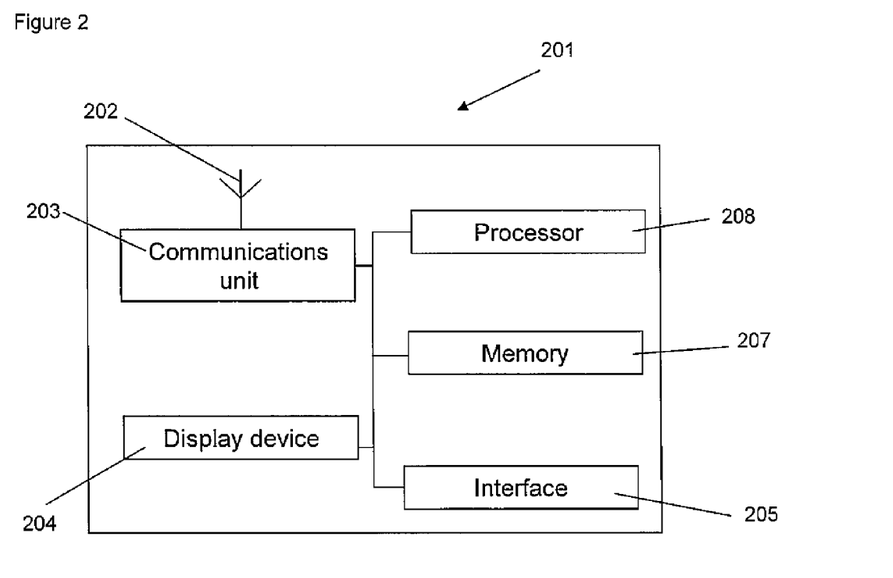
FIG. 2 depicts an example embodiment comprising a number of electronic components, including memory, a processor and a communication unit.

FIG. 2 depicts an apparatus (201) of a further example embodiment, such as a mobile phone. In other example embodiments, the apparatus (201) may comprise a module for a mobile phone (or PDA or audio/video player), and may just comprise a suitably configured memory (207) and processor (208).

The example embodiment of FIG. 2, in this case, comprises a display device (204) such as, for example, a Liquid Crystal Display (LCD) or touch-screen user interface. The apparatus (201) of FIG. 2 is configured such that it may receive, include, and/or otherwise access data. For example, this example embodiment (201) comprises a communications unit (203), such as a receiver, transmitter, and/or transceiver, in communication with an antenna (202) for connecting to a wireless network and/or a port (not shown) for accepting a physical connection to a network, such that data may be received via one or more types of networks. This example embodiment comprises a memory (207) that stores data, possibly after being received via antenna (202) or port or after being generated at the user interface (205). The processor (208) may receive data from the user interface (205), from the memory (207), or from the communication unit (203). It will be appreciated that, in certain example embodiments, the display device (204) may incorporate the user interface (205). Regardless of the origin of the data, these data may be outputted to a user of apparatus (201) via the display device (204), and/or any other output devices provided with apparatus (e.g. speaker). The processor (208) may also store the data for later use in the memory (207). The memory (207) may store computer program code and/or applications which may be used to instruct/enable the processor (208) to perform functions (e.g. read, write, delete, edit or process data).

Figure 3:
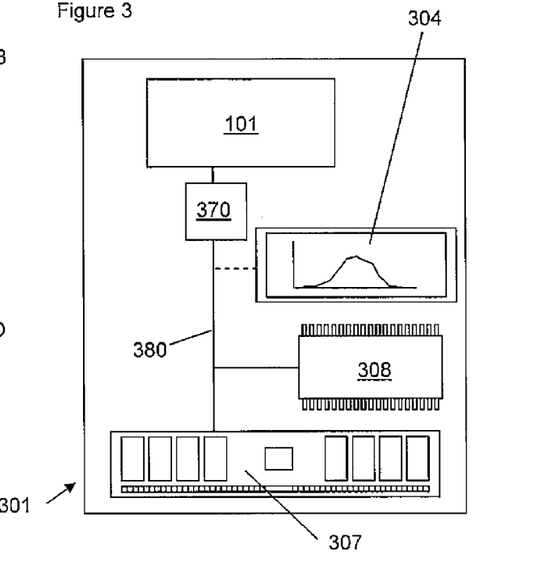
FIG. 3 depicts an example embodiment comprising a number of electronic components, including memory, a processor and a communication unit.

FIG. 3 depicts a further example embodiment of an electronic device (301), such as a tablet personal computer, a portable electronic device, a portable telecommunications device, a server or a module for such a device, the device comprising the apparatus (101) of FIG. 1. The apparatus (101) can be provided as a module for device (301), or even as a processor/memory for the device (301) or a processor/memory for a module for such a device (301). The device (301) comprises a processor (308) and a storage medium (307), which are connected (e.g. electrically and/or wirelessly) by a data bus (380). This data bus (380) can provide an active coupling between the processor (308) and the storage medium (307) to allow the processor (308) to access the computer program code. It will be appreciated that the components (e.g. memory, processor) of the device/apparatus may be linked via cloud computing architecture. For example, the storage device may be a remote server accessed via the internet by the processor.

The apparatus (101) in FIG. 3 is connected (e.g. electrically and/or wirelessly) to an input/output interface (370) that receives the output from the apparatus (101) and transmits this to the device (301) via data bus (380). Interface (370) can be connected via the data bus (380) to a display (304) (touch-sensitive or otherwise) that provides information from the apparatus (101) to a user. Display (304) can be part of the device (301) or can be separate. The device (301) also comprises a processor (308) configured for general control of the apparatus (101) as well as the device (301) by providing signalling to, and receiving signalling from, other device components to manage their operation.

The storage medium (307) is configured to store computer code configured to perform, control or enable the operation of the apparatus (101). The storage medium (307) may be configured to store settings for the other device components. The processor (308) may access the storage medium (307) to retrieve the component settings in order to manage the operation of the other device components. The storage medium (307) may be a temporary storage medium such as a volatile random access memory. The storage medium (307) may also be a permanent storage medium such as a hard disk drive, a flash memory, a remote server (such as cloud storage) or a non-volatile random access memory. The storage medium (307) could be composed of different combinations of the same or different memory types.

The aforementioned apparatus (101, 201, and 301) are configured to enable the comparison of shape data and accordingly enable the selection of a particular function as previously mentioned.

FIGS. 4a-4f depicts an example embodiment of the apparatus depicted in FIG. 2 comprising a portable electronic communications device (401), e.g. such as a e-reader, with a user interface comprising a flexible capacitive touch-screen user interface (405, 404), a memory (not shown), a processor (not shown) and an antenna (not shown) for transmitting and/or receiving data (e.g. emails, textual messages, phone calls, information corresponding to web pages). The capacitive touch screen user interface, in this case, is configured to detect objects within a detection range (e.g. within 5 cm of the touch screen).

In this case, the apparatus is configured to: determine a curvature of the deformable flexible user interface (405) area of the electronic device (401), the deformable flexible user interface (405) area being capable of detecting user input within a hover region (421); and based on the determined curvature, enable adjusting the hover input region of the user interface area to maintain a substantially flat planar hover input region across the deformable flexible user interface area.

Figure 4A:
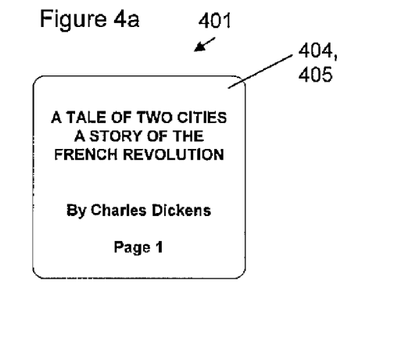
FIGS. 4a-4f depict an example embodiment comprising an e-reader.
Figure 4B:
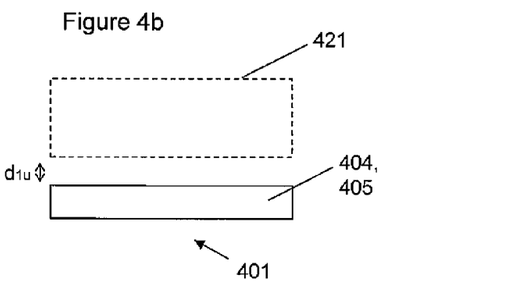

In the situation depicted in plan view in FIG. 4a and in cross-section in FIG. 4b, the user is using the device (401) to read an e-book. The screen is configured to display a page of the book, in this case the page 1 of Dickens' "A Tale of Two Cities" which is the title page. In the situation depicted in FIG. 4a, the touch screen user interface (405) is in a flat planar non-deformed configuration. In order to turn the e-pages in the flat planar non-deformed configuration, the user would provide a swipe hover gesture over the surface of the touch screen user interface (405). A swipe hover gesture to the left corresponds to turning to the next e-page, and a swipe hover gesture to the right corresponds to turning to the previous e-page. In this case, the touch screen is able to detect hover input within a detection range (421) of the surface of the touch screen user interface (e.g. more than 1 cm and less than 5 cm from the surface of the touch screen). In this case, the touch screen user interface (405) uses capacitive sensors to provide the hover input region. Other example embodiments may be configured to provide the hover input region using various known capacitive sensing technologies or other non-contact technologies, for example.

Before turning the page, the user rests the e-reader device (401) on his knee. This deforms the screen user interface (405) of the e-reader to form a curve. This is shown in perspective view FIG. 4c and in cross section in FIG. 4d. As the touch screen user interface (405) is deformed, the detection range (421) is also deformed as shown in FIG. 4d.

In this case, the apparatus is configured to determine a curvature of the deformable flexible user interface area of the electronic device, by determining the folding axis (451) and the curvature. In this case, the curvature may be expressed as an angle of curvature, $\theta$ (an associated arc length, a, which in this case is the width of the flexible user interface). Other example embodiments may be configured to calculate a radius of curvature or fit the curve using a mathematical expression (e.g. a polynomial function), or store the shape of the curve in a database of coordinates. In this case, the curvature is determined using strain gauges embedded within the flexible touch screen user interface area. Based on the determined curvature, the apparatus is configured to enable adjusting the hover input region of the user interface area to maintain a substantially flat planar hover input region (422) across the deformable flexible user interface area. In this case, the apparatus is configured to limit the extent of the plane so that the substantially flat planar hover input (422) is within the detection range (421) of the flexible touch screen user interface.

Figure 4C:
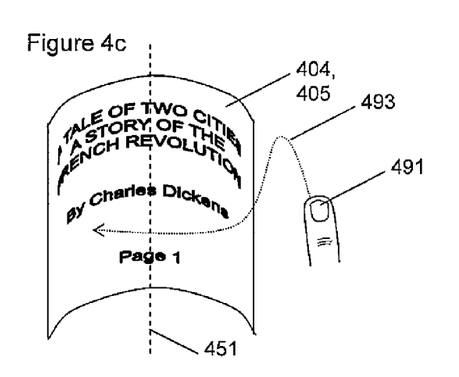

To navigate to the next page in the deformed configuration, the user would provide a swipe hover gesture using a stylus (which in this case is the users finger (491)) within the substantially flat planar hover input region (422) over the surface of the touch screen user interface. A swipe hover gesture to the left corresponds to turning to the next page, and a swipe hover gesture to the right corresponds to turning to the previous page. FIGS. 4c and 4d show the motion of a swipe hover gesture (493) to the left within the substantially flat planar hover input region.

Figure 4D:
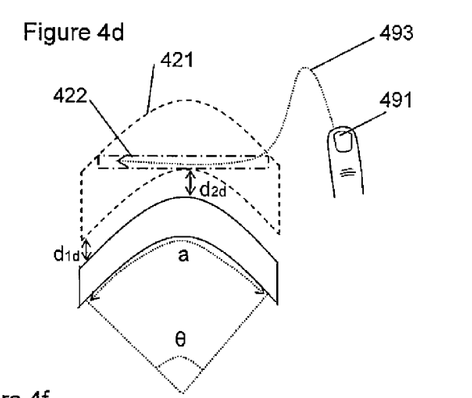

In this case, the apparatus/device is configured such that the distance, $d_{2d}$, between the substantially flat planar hover input region (422) and the user interface (405) in the deformed situation (as shown in FIG. 4d), is the same as the distance, $d_{1u}$, between the hover input detection range (421) and the user interface (405) in the undeformed situation (as shown in FIG. 4b). The distance, $d_{1d}$, between the detection range and the user interface in the deformed situation (which is not significant in this case) is also shown in FIG. 4d. That is, in this case, the substantially flat planar hover input region is 1 cm above the user interface as the hover detection range is also 1 cm above the user interface in the undeformed configuration. By positioning the substantially flat planar hover input region to correspond to the position of the detection range in the undeformed configuration, the user may be provided with a more consistent/intuitive user experience.

It will be appreciated that for other example embodiments, the distance between the substantially flat planar hover input region and the user interface in the deformed configuration may be different from the distance between the hover input detection range and the user interface in the undeformed situation.

It will be appreciated that example embodiments may be configured to ignore or disregard user input which is not provided within the substantially flat planar hover input region (422).

Figure 4E:
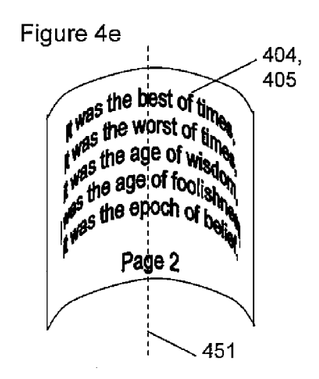

FIG. 4e shows the result of the swipe hover gesture shown in FIGS. 4c and 4d, which is that the flexible touch screen displays the next page of the e-book, which is page 2.

Figure 4F:
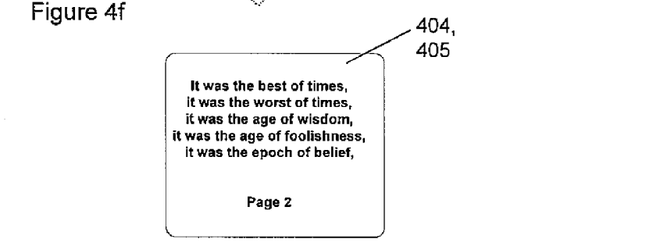

FIG. 4f shows the touch screen user interface of the e-book displaying page 2 after the flexible display has been returned to the non-deformed flat configuration.

In the present embodiment, the substantially flat planar hover input region is provided on the convex side of the curvature. It will be appreciated that other example embodiments may be configured to, in response to determining a concave curve, adjust the hover input region such that the substantially flat planar hover input region is provided on the concave side of the curvature.

By providing a substantially flat planar hover input region, the user can provide input to the flexible user interface in straight lines and/or within a flat plane. This may be more intuitive to the user who may be accustomed to providing input to flat planar user interfaces.

FIGS. 5a-5h depicts an further example embodiment comprising a portable electronic communications device (501), e.g. such as a mobile phone or music player with a user interface comprising a flexible touch-screen user interface (505, 504), a memory (not shown), a processor (not shown) and an antenna (not shown) for transmitting and/or receiving data (e.g. emails, textual messages, phone calls, information corresponding to web pages).

In this case, the apparatus is configured to: determine a curvature of the deformable flexible user interface area of the electronic device, the deformable flexible user interface area being capable of detecting user input within a hover region; and based on the determined curvature, enable adjusting the hover input region of the user interface area to maintain a substantially flat planar hover input region across the deformable flexible user interface area.

Figure 5A:
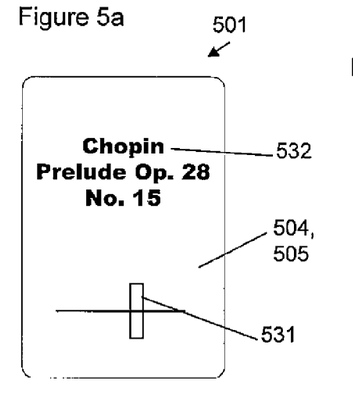
FIGS. 5a-5h depict a further example embodiment comprising a music player.

In the situation depicted in FIG. 5a, the user is using the device (501) to listen to music. When the device is being used to play music, the screen user interface is configured to provide track details (532) (in this case comprising the name of the composer and the name of the track) and a volume control (531). The volume control comprises a movable indicator which can be moved along a track. When the indicator is positioned more to the right, the volume is louder and when the indicator is positioned more to the left the volume is lower. In this case the user is listening to Prelude Op. 28, No. 15 by Chopin.

Figure 5B:
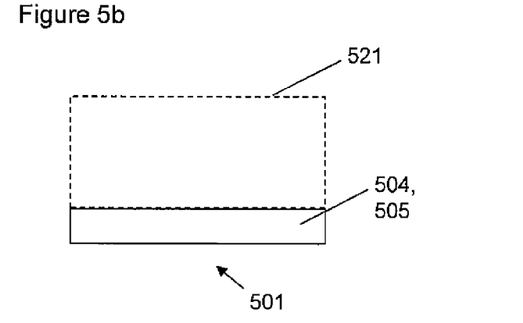

In the situation depicted in plan view FIG. 5a and in cross section in FIG. 5b, the touch screen user interface (505) is in a flat planar non-deformed configuration. The apparatus/device in this case is configured to recognise two types of user interaction when the device is in a planar configuration: touch input and hover input. In this example, a hover swipe input over the volume control allows the user to control the volume, whereas a touch swipe input with the flexible touch screen allows the user to skip to the next song (by swiping right) or to the previous song (by swiping left). In this case, the touch screen is able to detect hover input within a detection range (521) of the surface of the touch screen user interface (e.g. with 5 cm from the surface of the touch screen).

Figure 5C:
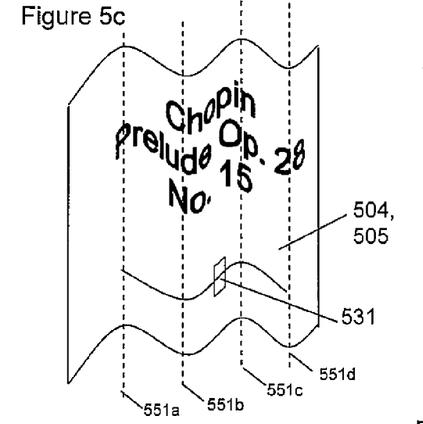
Figure 5D:
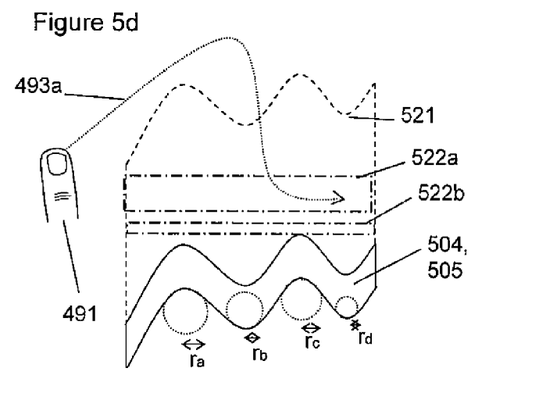

Before interacting with the user interface (505), the flexible touch screen user interface is deformed (e.g. as a result of being rested on an uneven surface). This deforms the screen of the music-player device to form a series of curves. This is shown in perspective view FIG. 5c and in cross section in FIG. 5d. As the touch screen is deformed, the detection range (521) is also deformed as shown in FIG. 5d.

In this case, the apparatus is configured to determine the shape of the deformed user interface by determining the plurality of curvatures of the deformable flexible user interface area of the electronic device, by determining the folding axis ($551a$-$d$) and the bending curvature ($r_{a-d}$) (e.g. expressed as a radius of curvature) for each curvature. Based on the determined curvatures, the apparatus is configured to enable adjusting the hover input region of the user interface area to maintain a substantially flat planar hover input region ($522a$ and $522b$) across the deformable flexible user interface area.

Unlike the previous case, which provided one substantially flat planar hover input region, in this embodiment, the apparatus/device is configured to provide two spaced apart substantially flat planar hover input regions ($522a$ and $522b$). A first substantially flat planar hover input region ($522b$) enables the user to provide input in the deformed configuration analogous to touch input provided in the non-deformed flat planar configuration. A second spaced apart substantially flat planar hover input region ($522a$) enables the user to provide input in the deformed configuration analogous to hover input provided in the non-deformed planar configuration. In other embodiments, the first and second flat planar hover input regions ($522a$, $522b$) may not be spaced apart but may immediately adjacent (or contiguous) with each other.

The first and second substantially flat planar regions ($522a$ and $522b$) are configured to be spaced apart in a direction normal to the planes of the flat planar hover input regions to form a vertically stacked configuration. It will be appreciated that other example embodiments may be configured to provide a plurality of flat planar hover input regions wherein the plurality flat planar hover input regions are spaced apart in a lateral direction (or at different heights to the user interface area) to form a laterally spaced configuration. In this latter case, the laterally spaced apart flat planar hover input regions may each provide hover input regions at different heights from the surface of the user interface area.

In this example, the first planar hover input region ($522b$) is configured to intersect the surface of the touch screen. That is, in this case the first planar hover input region is configured to intersect the most prominent (in this case highest) feature of the plurality of determined curvatures. Therefore input provided within the first planar hover input region may be provided as a touch input on the most prominent point or points of the deformed touch screen user interface ($505$). Input provided elsewhere within the first planar hover input region ($522b$) will be provided as hover input.

In this example, the second planar hover input region ($522a$) is configured to be above the most prominent feature of the deformed flexible touch screen user interface. In this way, the second planar hover input region does not intersect any portion of the deformed flexible touch screen user interface.

To enable adjusting the volume in the deformed configuration, the user would provide a swipe hover gesture within the second substantially flat planar hover input region ($522a$) over the surface of the screen. A swipe hover gesture within the second substantially flat planar hover input region ($522a$) to the right corresponds to increasing the volume, and a swipe hover gesture within the second substantially flat planar hover input region to the left corresponds to reducing the volume. FIGS. 5$c$ and 5$d$ show the motion of a swipe hover gesture to the right within the second substantially flat planar hover input region ($522a$) corresponding to increasing the volume.

Figure 5E:
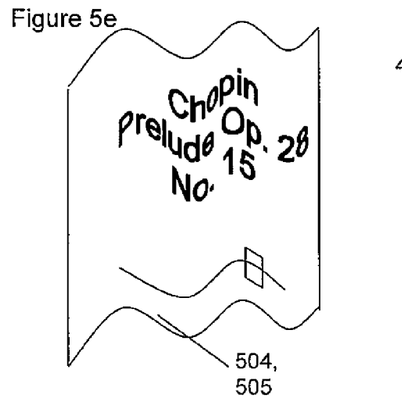
Figure 5F:
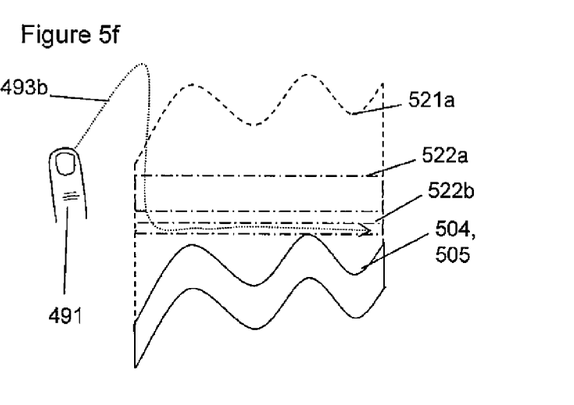
Figure 5G:
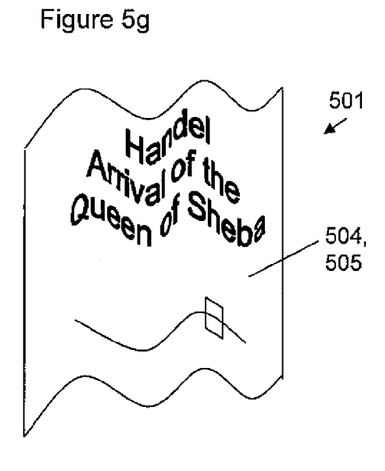
Figure 5H:
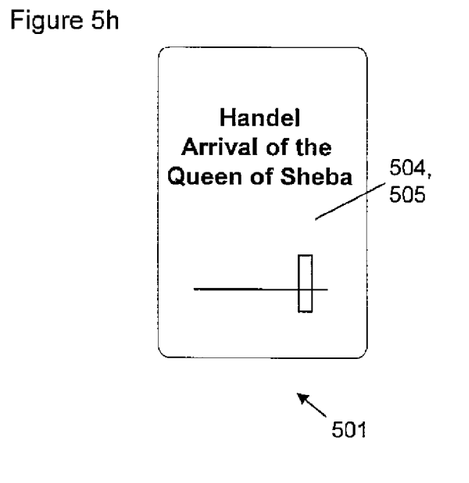

To change tracks in the deformed configuration, the user would provide a swipe hover gesture within the first substantially flat planar hover input region ($522b$) over the surface of the screen. A swipe hover gesture within the first substantially flat planar hover input region ($522b$) to the right corresponds to selecting the next track, and a swipe hover gesture within the first substantially flat planar hover input region to the left corresponds to selecting the previous track. FIGS. 5$e$ and 5$f$ show the motion of a swipe hover gesture to the right within the first substantially flat planar hover input region corresponding to selecting the next track.

Each of the user inputs available in the deformed configuration is configured to be analogous to the user inputs available in the flat non-deformed configuration. This may give the user a more consistent experience.

It will be appreciated that example embodiments may be configured to ignore user input which is not provided within the substantially flat planar hover input regions.

FIG. 5$g$ shows the result of the swipe hover gesture shown in FIGS. 5$e$ and 5$f$, which is that the flexible touch screen plays the next audio track, which in this case is Handel's "The arrival of the Queen of Sheba".

FIG. 5$h$ shows the flexible user interface of the electronic device after the flexible display has been returned to the non-deformed flat configuration.

By providing a substantially flat planar hover input region, the user can provide input to the flexible user interface in straight lines and/or within a flat plane. This may be more intuitive to the user who may be accustomed to providing input to flat planar user interfaces. The flat planar hover input regions (both deformed and non-deformed situations) may be considered to be horizontal with respect to (or at a constant distance from or parallel to) the undeformed user interface area. In certain embodiments the same distance from the user interface area is maintained in the deformed situation and the undeformed situation.

Figure 6A:
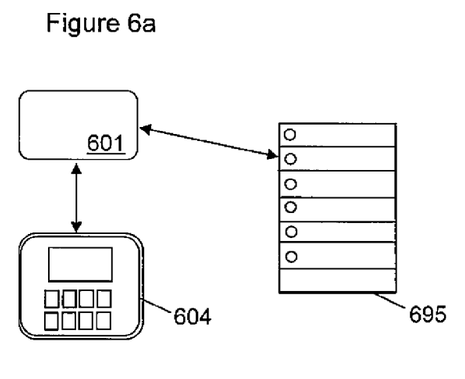
FIGS. 6a-6b illustrate an example apparatus in communication with a remote server/cloud.
Figure 6B:
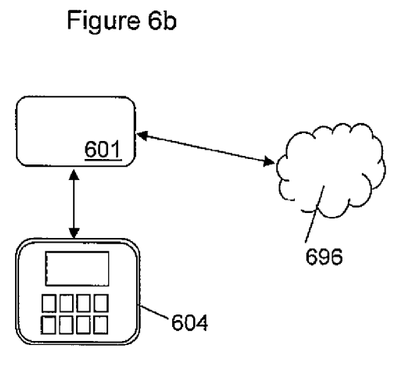

FIG. 6$a$ shows an example embodiment of an apparatus in communication with a remote server. FIG. 6$b$ shows that an example embodiment of an apparatus in communication with a "cloud" for cloud computing. In FIGS. 6$a$ and 6$b$, apparatus ($601$) (which may be apparatus ($101$), ($201$) or ($301$)) is in communication with a display ($604$). Of course, the apparatus ($601$) and display ($604$) may form part of the same apparatus/device, although they may be separate as shown in the figures. The apparatus ($601$) is also in communication with a remote computing element. Such communication may be via a communications unit, for example. FIG. 6$a$ shows the remote computing element to be a remote server ($695$), with which the apparatus may be in wired or wireless communication (e.g. via the Internet, Bluetooth, a USB connection, or any other suitable connection as known to one skilled in the art). In FIG. 6$b$, the apparatus ($601$) is in communication with a remote cloud ($696$) (which may, for example, by the Internet, or a system of remote computers configured for cloud computing). Some or all of the user applications and/or user content may be stored at the apparatus ($101$), ($201$), ($301$), ($601$). The functionality of curvature determination and the enabling the adjustment of the hover input region may be provided at the respective remote computing element ($695$), ($696$). The apparatus ($601$) may actually form part of the remote sever ($695$) or remote cloud ($696$). In such embodiments, the enablement of the shape data comparison and the provision of the particular function may be conducted by the server or in conjunction with use of the server/cloud.

Figure 7:
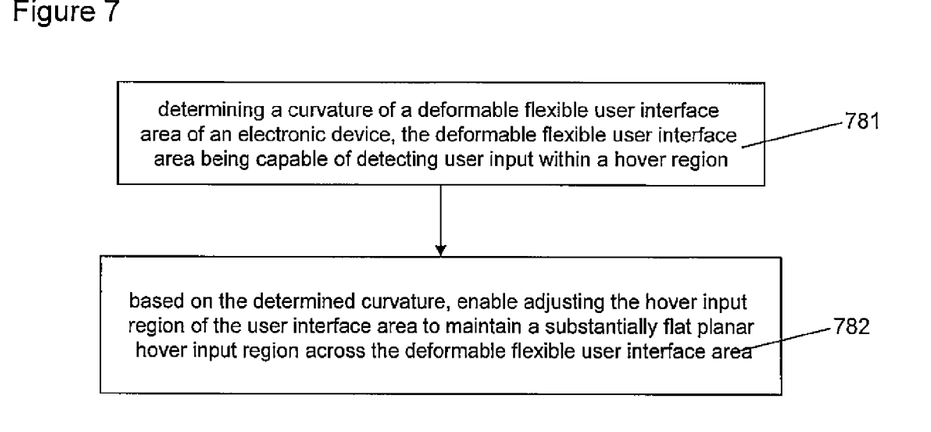
FIG. 7 illustrates a flowchart according to an example method of the present disclosure.

FIG. 7 illustrates the process flow according to an example embodiment of the present disclosure. The process comprises determining ($781$) a curvature of a deformable flexible user interface area of an electronic device, the deformable flexible user interface area being capable of detecting user input within a hover region; and, based on the determined curvature, enabling ($782$) adjusting the hover input region of the user interface area to maintain a substantially flat planar hover input region across the deformable flexible user interface area. The respective functionality (781) and (782) may be performed by the same apparatus or different apparatus.

Figure 8:
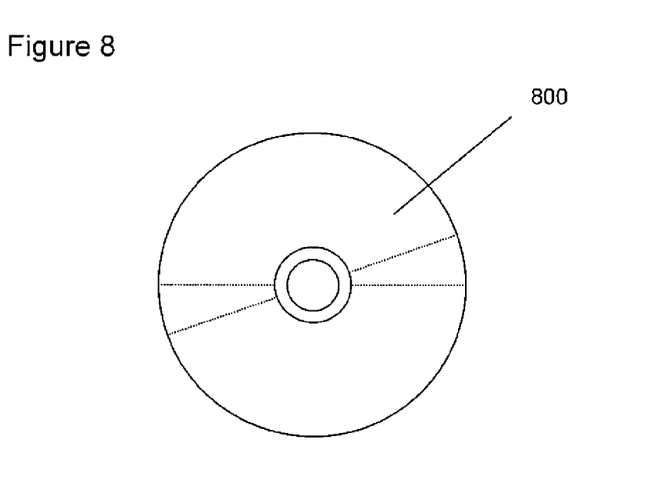
FIG. 8 illustrates schematically a computer readable medium providing a program.

FIG. 8 illustrates schematically a computer/processor readable medium (800) providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   based on a determined curvature of a deformable flexible user interface area of an electronic device, the deformable flexible user interface area being capable of detecting user input within a hover region, enable adjusting the hover input region of the user interface area to maintain a substantially flat planar hover input region across the deformable flexible user interface area.

2. The apparatus of claim 1, wherein the apparatus is configured to:
   determine a folding axis and/or bending angle of the flexible user interface area in order to determine the curvature of the deformable flexible user interface area.

3. The apparatus of claim 1, wherein the apparatus is configured such that the substantially flat planar hover input region intersects the deformed flexible user interface area at least at one point on the determined curvature and not at other points on the determined curvature.

4. The apparatus of claim 1, wherein the apparatus is configured to:

enable selection of a particular function of the electronic device based on user input provided within the substantially flat planar hover input region.

5. The apparatus of claim 1, wherein the apparatus is configured to:
disregard user input provided outside the substantially flat planar hover input region.

6. The apparatus of claim 1, wherein the deformable flexible user interface comprises a capacitive sensor.

7. The apparatus of claim 1, wherein the apparatus is configured to provide a plurality of substantially flat planar hover input regions, each flat planar hover input region being configured to enable initiation of distinct functionality of the electronic device.

8. The apparatus of claim 7, wherein the plurality of flat planar hover input regions are spaced apart in a direction normal to the planes of the flat planar hover input regions to form a vertically stacked configuration.

9. The apparatus of claim 7, wherein the plurality of flat planar hover input regions are spaced apart in a lateral direction to form a laterally spaced configuration.

10. The apparatus of claim 7, wherein:
a first substantially flat planar hover input region is associated with functionality corresponding to a touch gesture input as provided in the undeformed configuration and
a second substantially flat planar hover input region is associated with functionality corresponding to a hover gesture input as provided in the undeformed configuration,
the first substantially flat planar hover input region being closer to the user interface area than the second substantially flat planar hover input region.

11. The apparatus of claim 1, wherein the apparatus is configured to determine a plurality of curvatures of a deformable flexible user interface area.

12. The apparatus of claim 11, wherein the substantially flat planar hover input region is configured to be above the most prominent feature of the plurality of determined curvatures.

13. The apparatus of claim 1, wherein the user interface area is one or more of a touchpad, and a touch-screen.

14. The apparatus of claim 1, wherein the apparatus or electronic device is a portable electronic device, a laptop computer, a desktop computer, a mobile phone, a Smartphone, a monitor, a personal digital assistant, a tablet computer or a digital camera, or a module for the same.

15. A method comprising:
based on a determined curvature of a deformable flexible user interface area of an electronic device, the deformable flexible user interface area being capable of detecting user input within a hover region, enable adjusting the hover input region of the user interface area to maintain a substantially flat planar hover input region across the deformable flexible user interface area.

16. A computer readable non-transitory medium comprising a computer program, the computer program comprising code configured to:
based on a determined curvature of a deformable flexible user interface area of an electronic device, the deformable flexible user interface area being capable of detecting user input within a hover region, enable adjusting the hover input region of the user interface area to maintain a substantially flat planar hover input region across the deformable flexible user interface area.

17. The apparatus of claim 1, wherein the apparatus is configured to determine the curvature of the deformable flexible user interface area of the electronic device.

* * * * *